United States Patent [19]
Honda et al.

[11] Patent Number: 5,185,677
[45] Date of Patent: Feb. 9, 1993

[54] TRANSMISSION TYPE PROJECTION SCREEN ASSEMBLY

[75] Inventors: Makoto Honda; Nobuyuki Mizuno, both of Tokyo, Japan

[73] Assignee: Dai Nippon Printing Co., Ltd., Japan

[21] Appl. No.: 832,038

[22] Filed: Feb. 6, 1992

[30] Foreign Application Priority Data

Feb. 9, 1991 [JP] Japan .................. 3-039124

[51] Int. Cl.$^5$ .............................................. G03B 21/56
[52] U.S. Cl. .................................... 359/460; 40/603; 160/378
[58] Field of Search ................. 359/443, 450, 460; 160/378; 40/603

[56] References Cited

U.S. PATENT DOCUMENTS

| | | | |
|---|---|---|---|
| 3,942,869 | 3/1976 | Portner et al. | 350/117 |
| 4,406,519 | 9/1983 | Shaw | 350/117 |
| 4,574,506 | 3/1986 | Morgan | 40/603 |
| 4,984,871 | 1/1991 | Martinez | 350/117 |

FOREIGN PATENT DOCUMENTS 60-154940 10/1985 Japan .

Primary Examiner—Richard A. Wintercorn
Attorney, Agent, or Firm—Parkhurst, Wendel & Rossi

[57] ABSTRACT

A transmission type projection screen assembly comprises a relatively thin flexible screen, and a plurality of small force receiving blocks fixed at spaced-apart positions in a horizontal row to the flexible screen along the upper and lower edges thereof. Spring devices are inserted between adjacent small blocks so that constant horizontal tension is applied to the screen to prevent wrinkling and deflection thereof. A horizontal support beam is fixed to a screen support frame and suspendingly supports the flexible screen via the upper small blocks, and a relatively rigid screen is placed in flush contact with the flexible screen and rests on the lower small blocks. The weight of the rigid screen applies vertical tension to the flexible screen so that wrinkling and deflection of the flexible screen is further prevented.

15 Claims, 4 Drawing Sheets

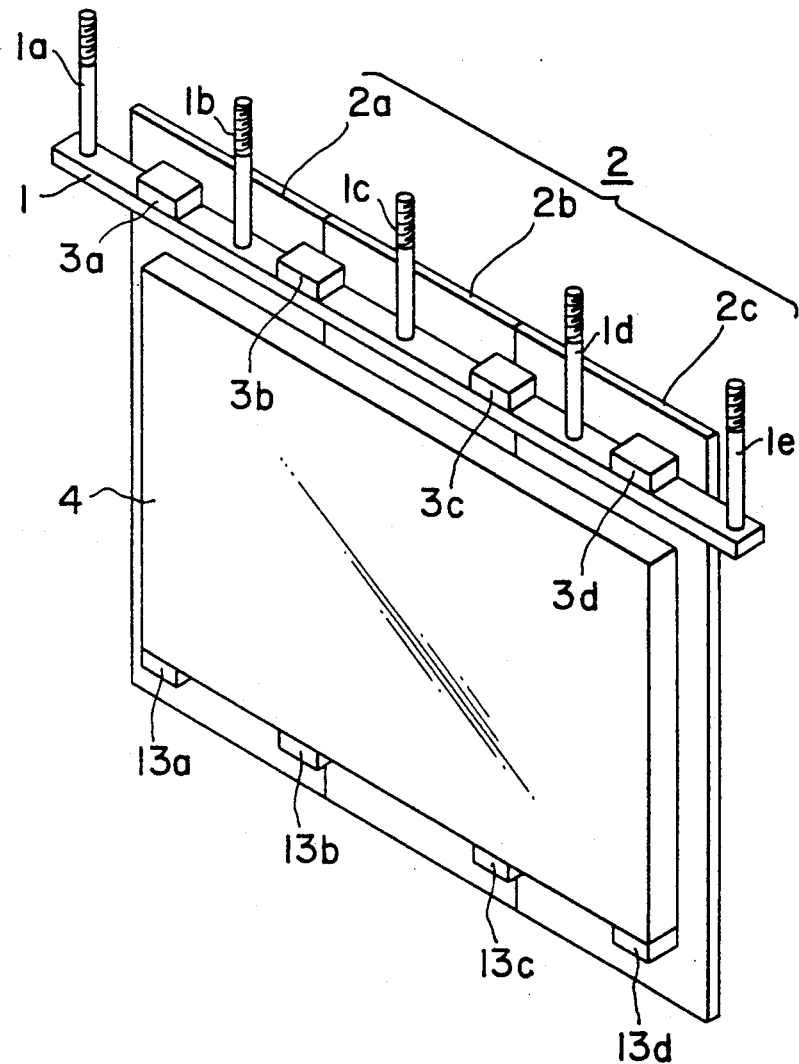
F I G. 1

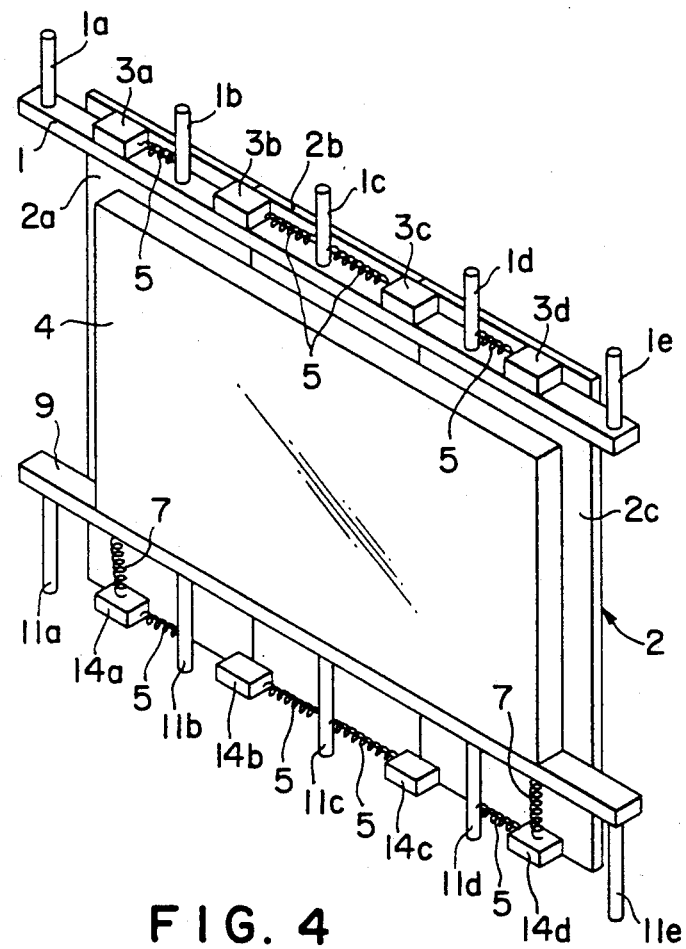
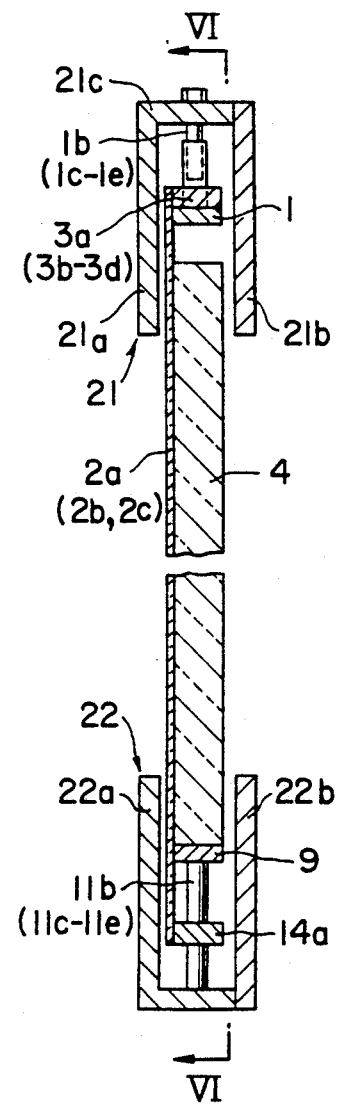
FIG. 4
FIG. 5

TRANSMISSION TYPE PROJECTION SCREEN ASSEMBLY

BACKGROUND OF THE INVENTION

The present invention relates generally to a transmission type screen assembly, or rear projection screen assembly, used for television projectors and the like. More particularly, the invention relates to a transmission type projection screen assembly having a support structure and being suitable for large-size screens.

In general, large-size screens for projectors are subject to deflection and wrinkling thereof and to generation of a gap between screens due to variations in temperature and humidity. Heretofore, in order to prevent these deformations, a tensioning mechanism has been provided between each screen and its support frame for applying tension to the screen toward its periphery, as disclosed in Japanese Utility Model Laid-Open Publication No. 60-154,940. This preventive measure has been substantially successful.

However, this measure necessitates the use of a tensioning mechanism of complicated construction and a strong and large support frame capable of withstanding the tension it applies.

SUMMARY OF THE INVENTION

It is an object of this invention to provide a transmission type projection screen assembly which has a simple screen supporting construction including a thin support frame and being suitable for a multiscreen structure wherein a plurality of screens are disposed side by side in a common plane and which thereby overcomes the above described problems of the prior art.

According to this invention, there is provided a transmission type projection screen assembly comprising essentially a transmission type screen and a support frame, said assembly comprising: a first set of force receiving members fixed at spaced positions in a horizontal row to said screen along at least one of upper and lower edges of the screen, said force receiving members being made of a material having a coefficient of thermal expansion substantially equal to that of said screen; a second set of force receiving members provided at horizontally spaced positions and each disposed between adjacent force receiving members of said first set; and force applying means intervening between adjacent force receiving members of said first and second sets for applying a force to the adjacent members so as to urge the same to separate horizontally from each other to thereby produce a horizontal tension in said sheet.

In an embodiment of this invention, the second set of force receiving members are fixed in a horizontal row to the screen and made of a material having a coefficient of thermal expansion substantially equal to that of the screen.

In another embodiment of this invention, the second set of force receiving members are fixed to the support frame so as to project between the force receiving members of the first set.

According to this invention, the above described force applying means are effective to produce horizontal tensile forces in the screen. These tensile forces are dispersed in the horizontal direction and are of considerable magnitude approaching the tensile strength of the material of the screen. Thus the screen is stretched in a substantially uniform manner.

Some embodiments of this invention will now be described in detail below with reference to the accompanying drawings.

BRIEF DESCRIPTION OF THE DRAWINGS

FIG. 1 is a perspective view showing the construction of essential parts of an embodiment of this invention;

FIG. 4 is a perspective view of essential parts of another embodiment of this invention;

FIG. 5 is a side elevation in vertical section, showing the state of mounting of the essential parts shown in FIG. 4 in a support frame.

DETAILED DESCRIPTION OF THE PREFERRED EMBODIMENTS

FIG. 1 shows essential parts of a transmission type screen assembly according to this invention. A rectangular support frame to be described later is omitted in FIG. 1.

The screen assembly comprises a relatively thin, flexible transmission type screen 2 and a relatively thick, rigid transparent screen 4. These screens 2 and 4 are arranged vertically in superposed relation to pass light therethrough.

Figure 2:
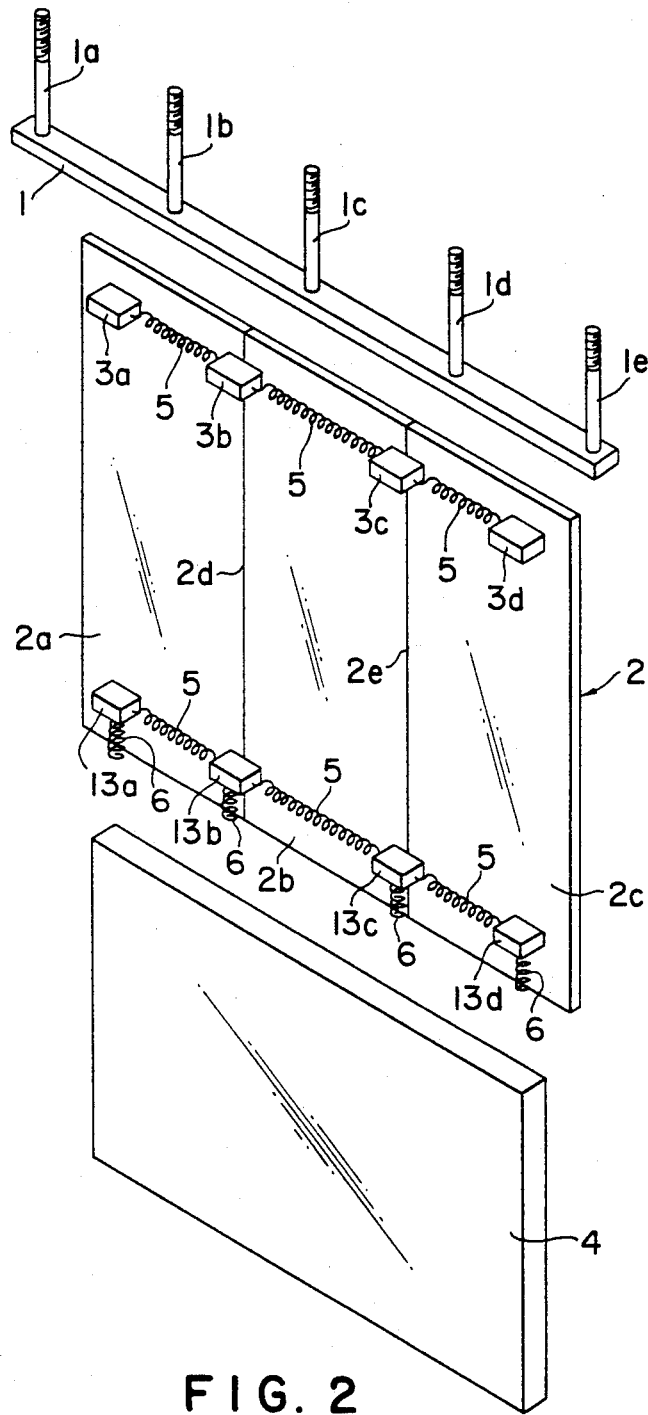
FIG. 2 is an exploded perspective view of the essential parts of the embodiment shown in FIG. 1.

As shown in FIG. 2, the thin screen 2 may be made of a plurality of (three in the embodiment shown) screen elements 2a, 2b and 2c which are in horizontally adjoining relation and joined side-by-side in a common plane with their adjacent vertical edges in abutting state. The screen 2 is typically a flexible lenticular lens sheet made of an acrylic resin. The screen 2 may have vertically or horizontally extending parallel lenticular lenses on at least one surface thereof. The lenticular lens sheet with vertically extending lenticular lenses is for diffusion of light in the horizontal direction, and the one with horizontally extending lenticular lenses is for diffusion of light in the vertical direction. The screen 2 may also be constituted by a plurality of lens sheets of the above character, which are closely superposed upon one another.

The thin screen 2 has on one planar surface thereof upper and lower horizontal rows of force receiving members 3a, 3b, 3c, 3d and 13a, 13b, 13c, 13d which are adhesively fixed to the one surface of the screen 2 along the upper and lower edges of the screen. The force receiving members are in the form of a rectangular block in the embodiment shown. These blocks are made of a material of a coefficient of thermal expansion which is substantially equal to that of the material of the lenticular lens sheets 2a, 2b, and 2c.

Some force receiving members 3b, 3c, 13b and 13c are fixed to the screen 2 on joining lines 2d and 2e between adjacent screen elements so that these members serve to integrally secure the adjacent screen elements so as to reinforce the joints of the screen elements.

Figure 3:
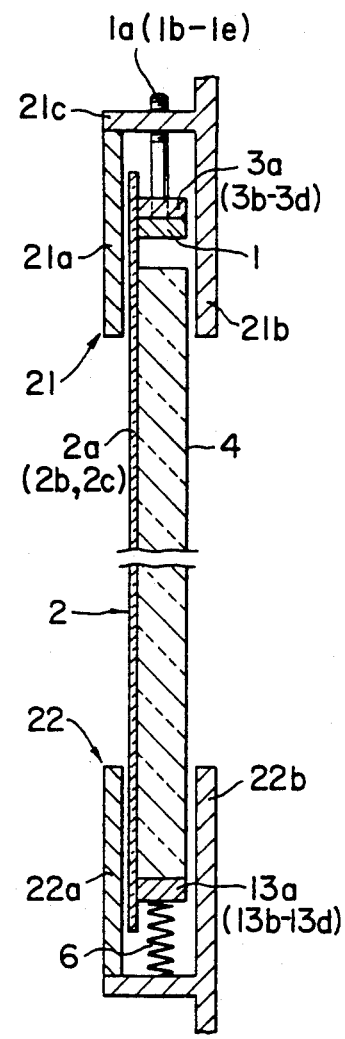
FIG. 3 is a side elevation, in vertical section, showing the state of mounting of the essential parts shown in FIG. 1 in a support frame.

A horizontal support beam 1 shown in FIG. 2 has upwardly extending rods 1a-1e which are externally threaded as shown. These rods are caused to pass through, and be secured to, a top plate 21c of a support frame 21 shown in FIG. 3, as by nuts screwed to the rods. As a result, the horizontal beam 1 extends below the top plate 21c in parallel relation thereto as shown in FIG. 3. The support frame 21 constitutes an upper horizontal extension of a generally rectangular frame for encompassing the screen 2. The support frame 21 has a first depending flange 21a and a second depending flange 1b integral with the top plate 21c. The two depending flanges 21a and 21c define therebetween a downwardly directed groove as shown. There is provided a lower support frame 22 which constitutes a lower horizontal extension of the generally rectangular frame. The lower support frame 22 has parallel upstanding flanges 22a and 2b defining an upwardly directed groove therebetween.

In the assembled state of the projection screen assembly as shown in FIG. 3, the force receiving members 3a–3d of the upper row are placed on the upper surface of the horizontal beam 1 as most clearly shown in FIG. 1, so that the thin screen 2 is suspended from the beam 1 and the upper force receiving members 3a–3d are concealed within the upper support frame 21, while the lower force receiving members 13a–13d are concealed within the lower support frame 22.

The relatively thick screen 4 is disposed in contact with the screen 2 on the same surface thereof as the force receiving members 3a–3d and 13a–13d. The screen 4 in the case of the instant embodiment is formed from a Fresnel lens sheet and is placed on the upper surfaces of the lower force receiving members 13a–13d as most clearly shown in FIG. 1.

As shown in FIG. 2, force applying means in the form of compression spring devices 5 are inserted between respective pairs of adjacent force receiving members 3a–3d and 13a–13d to exert forces tending to separate the adjacent force receiving members.

In some case, a lenticular lens sheet for diffusion in the horizontal direction and a lenticular lens sheet for diffusion in the vertical direction can be used without using a Fresnel lens sheet. In this case, the force receiving members are bonded to the lenticular lens sheet for horizontal diffusion, and the lenticular lens sheet for vertical diffusion is placed on the lower row of the force receiving members.

In the assembled state of FIG. 3, relative movements between the upper force receiving members 3a–3d and the support beam 1 and between the lower force receiving members 13a–13d and lower edge surface of the thick screen 4 are restricted only by the contact friction therebetween. The shapes and construction of the suspending structure comprising the support beam 1 and the force receiving members are not restricted to those illustrated in the drawings but may be of other forms provided that they enable the practice of this invention.

The thick screen 4 has normally a suitable rigidity. In the above described assembled state, the front and back surfaces of the screens 2 and 4 are positioned in the front-to-back direction with their upper and lower parts concealed respectively by the flanges 21a and 22a and flange parts 21b and 22b of the support frame. Taking a vertical attitude, the screens 2 and 4 are positioned by only the support beam 1 suspending the upper part of the screen 2. Therefore, the weight of the thick screen 4, acting through the lower force receiving members 13a–13d, imparts a downward tensioning force on the lower part of the thin screen 2. Thus the thin screen 2 is tensioned in the vertical direction.

Further in the case the thick screen 4 is so heavy that the vertical forces excerted by the thick screen 4 exceed the tensile strength of the thin screen 2, vertical compression spring devices 6 can be inserted between the lower force receiving members 13a–13d and the lower support frame 22 so as to limit the vertical tensile force within the tensile strength of the thin screen 2.

As described hereinbefore, the spring devices 5 are inserted between adjacent force receiving members in each of the upper and lower horizontal rows. These spring devices 5 are exerting forces on their respective adjacent force receiving members, which forces tend to force apart these force receiving members. Thus a stretching force in the horizontal direction is applied to each of the upper and lower parts of the thin screen 2.

The forces exerted by the spring devices 5 must be less than the tensile strength of the thin screen 2. On the other hand, it is necessary that these spring forces be of an order such as to be able to move the force receiving members 3a–3d, with the assembly in the state wherein the thin screen 2 is supported via the force receiving members 3a–3d by the support beam 1 and wherein the thick screen 4 is supported via the force receiving members 13a–13d by the thin screen 2. Furthermore, these spring forces are required to be of an order such as to the force receiving members 13a–13d in the leftmove right horizontal direction.

In this connection, the spring devices 5 may be inserted only between the upper force receiving members. However, insertion of spring devices 5 also between the lower force receiving members will result in greater effectiveness. The type and shape of the spring devices 5 are suitably selected.

The thin, flexible screen 2 is subjected to tension in each of the vertical and horizontal directions as described above. As a result, its property of retaining its planar state is improved, whereby wrinkling and deflection of the screen sheet 2 is prevented, and the thin screen sheet 2 readily adheres intimately to the thick screen sheet 4. Of course, the screen assembly retains this property against variations due to elapse of time, sudden temperature variations, and variations in humidity. Furthermore, since the weight due to gravity of the thick screen 4 is utilized for exerting the vertical tension on the thin screen 2, the tension in the vertical direction is constant, and a support frame of simple construction suffices.

In addition, the force receiving members are fixed to the upper part and the lower part of the thin screen 2 on the same surface thereof. Moreover, the thick screen 4 is resting on the lower force receiving members 13a–13d. For this reason a torque due to the downward tension on the thin screen 2 acts on the upper part of the thin screen 2 about the line of row of the upper force receiving members 3a–3d as an axis. This torque acts to bring the thin screen 2 into closer to the thick screen 4, whereby the two screen 2 and 4 are placed in more intimate contact with each other.

As described in detail in the foregoing description, the present invention affords the following features of effect and merit.

According to the invention, the screen 2 is subjected to a horizontal tension by virtue of the spring devices 5. Moreover, this tension is dispersed in the horizontal direction. Thus the screen 2 is pulled outwardly in a substantially uniform manner with a tensile force approaching the tensile strength of the material of the screen. For this reason, the occurrence of wrinkles, deflections, and undesirable gaps is greatly reduced in comparison with that in the conventional screen assembly in which the screens are pulled at its opposite edges.

Another feature of this invention is the suspension of the screen by means of the force receiving members fixed thereto at positions near the upper edge thereof, from the support beam fixed to the support frame. By this constructional feature, the force receiving members serving to impart tension to the screen function doubly to mount the screen on the support frame.

Still another preferable feature is the fixing of the force receiving members in a horizontal row also along the lower edge of the relatively thin screen and the placing of a second screen on these lower force receiving members. Thus, these members function to connect the two screens. By this constructional feature, the tension applied to the first screen in the vertical direction also is distributed and there is no local concentration of stress as compared with the conventional construction wherein the screen or screens are pulled outward at its periphery by the support frame. As a result the possibility of trouble such as breakage or damaging of the screens is reduced.

A further feature is that an especially strong and rigid structure with thick parts is not required for the screen support frame. The reason for this is that, as described above, the tension on the screens in the vertical and horizontal directions is not applied by tensioning mechanisms mounted on the support frame. Thus the construction of the support frame is simple and may comprise thin members. Especially the lateral members of the support frame can be made thin. Therefore the screen assembly of this invention is suitable for a multi-screen structure projection screen assembly which can be erected by assembling a plurality of lens screen elements side-by-side in a horizontal row and joining their abutting edges.

Furthermore, the joints between the abutting lateral edges of the screens in a multiscreen assembly are reinforced by some of the force receiving members in the form of the small blocks fixed across the joints so as to overlap the adjacent screen elements.

Figure 6:
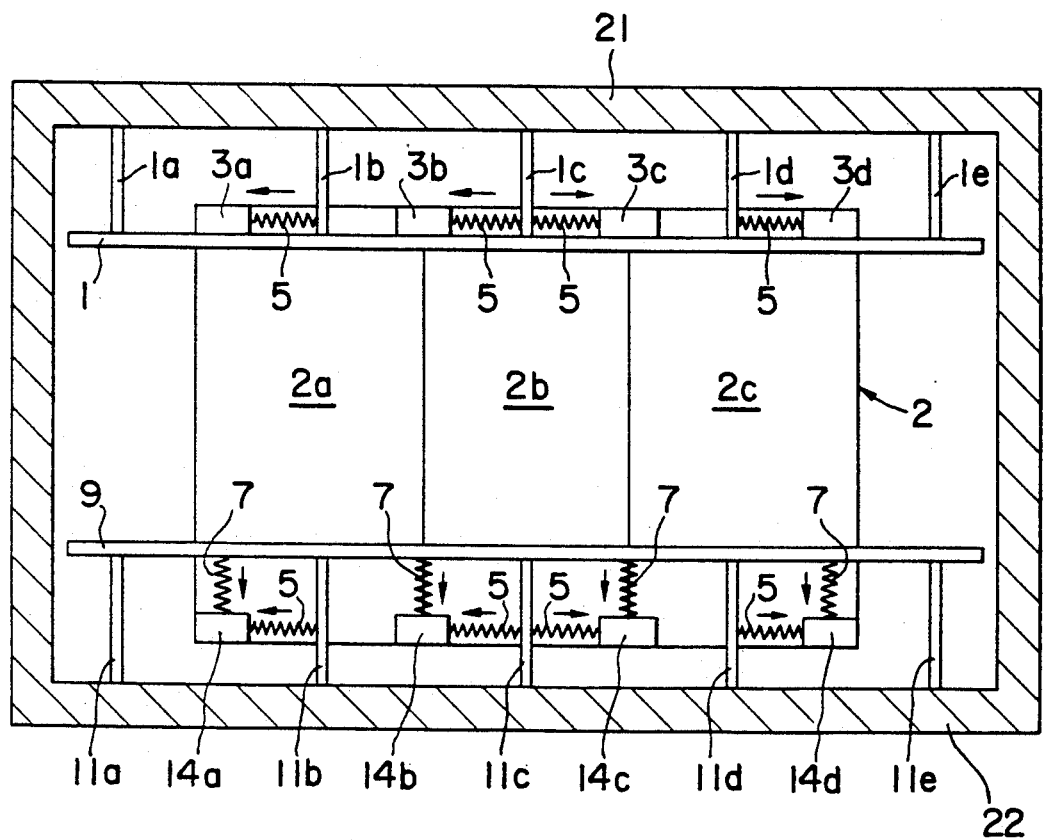
FIG. 6 is a vertical section taken along the line VI—VI in FIG. 5.

FIGS. 4 through 6 show another embodiment of this invention. In these figures, members and parts equivalent in function to those shown in FIGS. 1 through 3 are designated by the same reference characters as used in FIGS. 1 through 3 and will not be described in detail.

In the embodiment of FIGS. 1 through 3, the force applying means or spring devices 5 are inserted between adjacent force receiving members 3a-3d and 13a-13d all fixed to the surface of the screen 2, and forces tending to separate adjacent force receiving members are exerted by the spring devices 5. Any pair of adjacent force receiving members can be considered to consist of a first member acted upon by the spring device 5 to operate as intermediary means for exerting a horizontal tensile force on the screen 2, and a second member receiving a reactive force of the spring device 5. For example, the members 3a and 3d operate as first members while the members 3b and 3c can be considered to operate as second members On the other hand, when the members 3b and 3c are taken as a pair of adjacent force receiving members, they both act as a first member as well as a second member. However, in order for either one member 3b or 3c to act as a first member, the other member 3c or 3b must act as a second member because without the other member which reacts the force of the spring device the one member would not be able to act to exert a tensile force on the screen 2. For this reason, the force receiving members of the embodiment of FIGS. 1 through 3 can be categorized into a first set of members functioning as first members and a second set of members functioning as second members.

In the embodiment of FIGS. 4 through 6, first force receiving members 3a, 3b, 3c and 3d are adhesively fixed to the surface of the thin screen 2 along the upper edge of the screen 2. However, second force receiving members are fixed not to the screen 2 but to the support frame 21. More specifically, vertical members 1a, 1b, 1c, 1d and 1e for mounting the horizontal support beam 1 to the support frame 21 function as a second set of force receiving members for receiving reaction forces of the spring devices 5. This means that the spring devices 5 are inserted between the members 3a and 1b, between the members 3b, and 1c, between the members 1c and 3c and between the members 1d and 3d, as clearly indicated in FIGS. 4 and 6. In this embodiment, therefore, the first set of force receiving members 3a, 3b, 3c and 3d are movable members, while the second set of force receiving members 1b, 1c and 1d are stationary members. It will be understood that all of the screen elements 2a, 2b and 2c are subjected to horizontal tensile forces due to the function of the spring devices 5.

In this embodiment, the lower support frame 22 has upstanding members 11a-11e extending upward from the frame 22. These members 11a-11e carry on the tops thereof a base beam 9 extending horizontally above the bottom plate of the support frame 22.

The screen 2 is mounted on the support beam 1 via the force receiving members 3a, 3b, 3c and 3d, as in the case of the embodiment of FIGS. 1 through 3. The screen 2 extends to a level below the base beam 9 and has a horizontal row of force receiving members 14a, 14b, 14c and 14d each in the form of a block. These members 14a-14d are adhesively fixed to the screen 2.

The upstanding members 11b-11d are disposed between adjoining force receiving members 14a-14d as clearly shown in FIGS. 4 and 6, and spring devices 5 are inserted between adjoining pairs of the upstanding members and the block members. Also in this case, the block members 14a-14d function as a first set of force receiving members, and the upstanding members 11b-11d function as a second set of force receiving members, so that the screen 2 is subjected to horizontal tensile forces in the region along the lower edge of the screen.

Further spring devices 7 operating as force applying means are inserted between the block-shaped force receiving members 14a-14d and the lower surface of the base beam 9, respectively. These spring devices 7 exert downward forces to the force receiving members 14a-14d, respectively, and hence to the lower edge of the screen 2. For this reason the screen 2 is subjected to vertical tensile forces throughout the horizontal width thereof.

As shown in FIG. 4 and 5, the thick screen 4 is placed on the base beam 9 so as to be superposed with the screen 2.

It will be understood that horizontal and vertical tensions are constantly applied to the flexible screen 2 also in this embodiment of the invention.

What is claimed is:

1. A transmission type projection screen assembly comprising essentially a transmission type screen and a support frame for the screen, said assembly comprising:
   a first set of force receiving members fixed at spaced positions in a horizontal row to said screen along at least one of upper and lower edges of the screen, said force receiving members being made of a material having a coefficient of thermal expansion substantially equal to that of said screen;

a second set of force receiving members provided at horizontally spaced positions and each disposed between adjacent force receiving members of said first set; and force applying means intervening between adjacent force receiving members of said first and second sets for applying a force to the adjacent members so as to urge the same to separate horizontally from each other to thereby produce a horizontal tension in said sheet.

2. The transmission type projection screen assembly according to claim 1, wherein said second set of force receiving members are fixed in a horizontal row to said screen and made of a material having a coefficient of thermal expansion substantially equal to that of the screen.

3. The transmission type projection screen assembly according to claim 2, wherein said support frame has a horizontal support beam extending below said support frame and said first and second sets of force receiving members disposed along said upper edge of the screen are supported on said support beam so as to suspend the screen from the support beam.

4. The transmission type projection screen assembly according to claim 2, wherein said force receiving members are in the form of a block.

5. The transmission type projection screen assembly according to claim 3, further comprising a second screen disposed in superposed relation to said first mentioned screen and placed on said first and second sets of force receiving members disposed along said lower edge of the first mentioned screen to thereby produce a vertical tensile force in the first mentioned screen due to the weight of the second screen.

6. The transmission type projection screen assembly according to claim 5, wherein the first mentioned screen is a lenticular lens sheet and the second screen is a Fresnel lens sheet which is more rigid than the lenticular lens sheet.

7. The transmission type projection screen assembly according to claim 2, wherein said screen is made of a plurality of horizontally adjoining screen elements joined along vertical joining edges thereof, and some of the force receiving members are fixed to two adjacent screen elements on the vertical joining edges.

8. The transmission type projection screen assembly according to claim 1, wherein said second set of force receiving members are fixed to said support frame so as to project between the force receiving members of the first set.

9. The transmission type projection screen assembly according to claim 8, wherein said support frame has a horizontal support beam extending below said support frame and said support beam is connected to the support frame by way of said second set of force receiving members, and wherein said first set of force receiving members disposed along said upper edge of the screen are supported on said support beam so as to suspend the screen from the support beam.

10. The transmission type projection screen assembly according to claim 8, wherein said support frame has a horizontal base beam extending above said support frame and said horizontal base beam is connected to the support frame by way of said second set of force receiving members, and wherein a second screen is placed on the base beam in superposed relation to said first mentioned screen.

11. The transmission type projection screen assembly according to claim 10, wherein second force applying means are provided between said horizontal base beam and the first set of force receiving members disposed along the lower edge of the first mentioned screen to thereby produce a vertical tensile force in the first mentioned screen.

12. The transmission type projection screen assembly according to claim 11, wherein said second force applying means are in the form of a compression spring.

13. The transmission type projection screen assembly according to claim 8, wherein said first set of force receiving members are in the form of a block.

14. The transmission type projection screen assembly according to claim 10, wherein the first mentioned screen is a lenticular lens sheet and the second screen is a Fresnel lens sheet which is more rigid than the lenticular lens.

15. The transmission type projection screen assembly according to claim 1, wherein said force applying means is in the form of a compression spring.

* * * * *